No. 693,066. Patented Feb. 11, 1902.
A. W. RICHARDS.
CORN HARVESTER.
(Application filed June 11, 1901.)
(No Model.) 3 Sheets—Sheet 1.
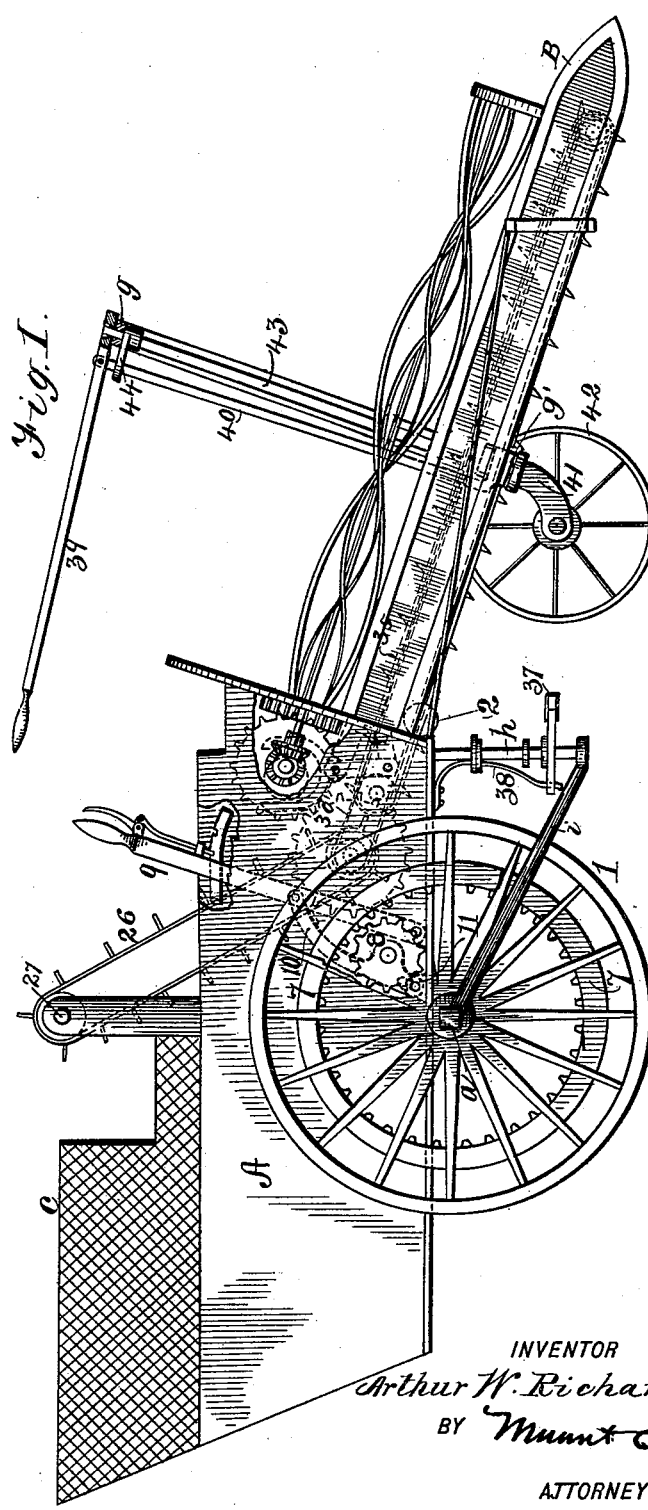
WITNESSES:
INVENTOR
Arthur W. Richards
BY
ATTORNEYS

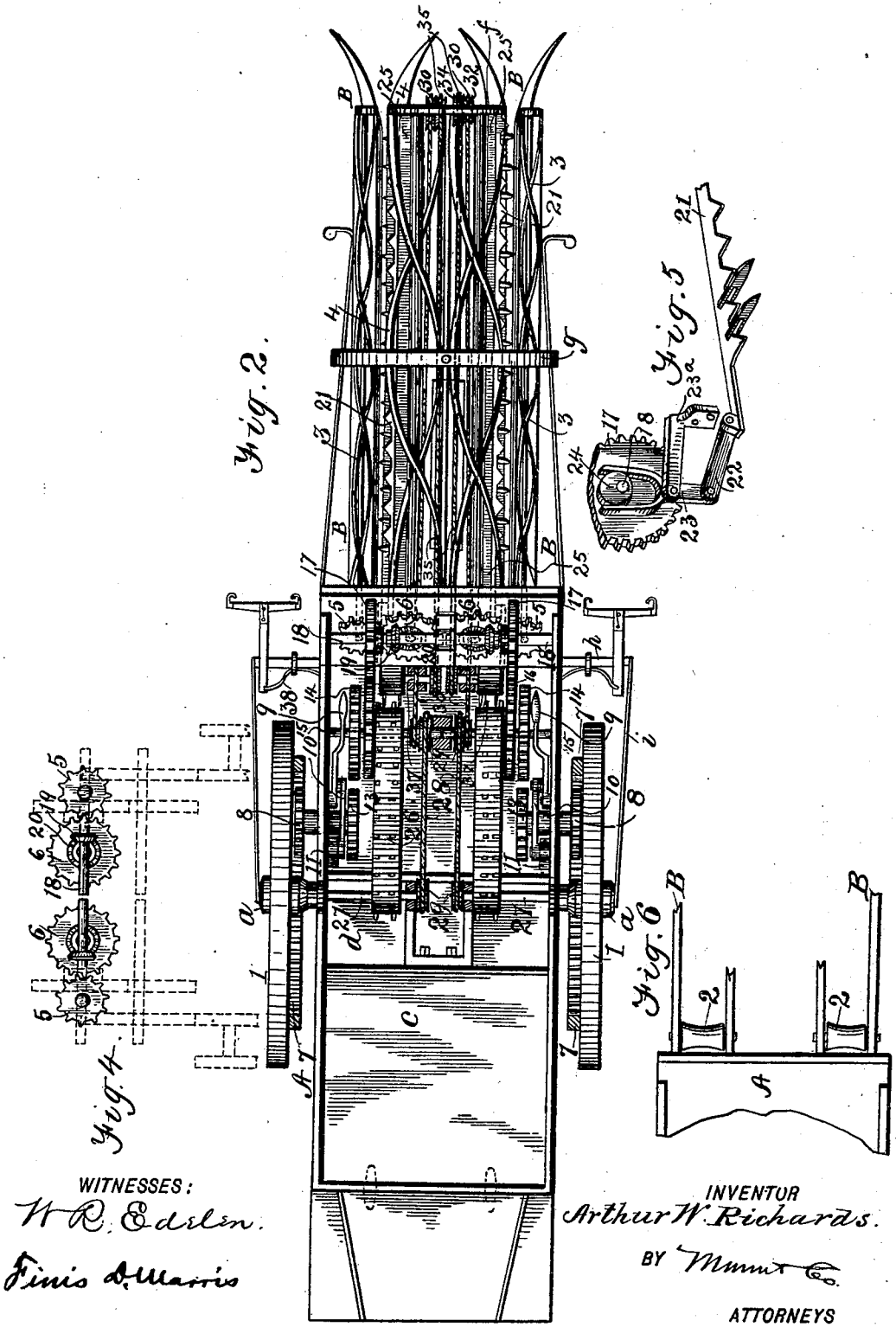

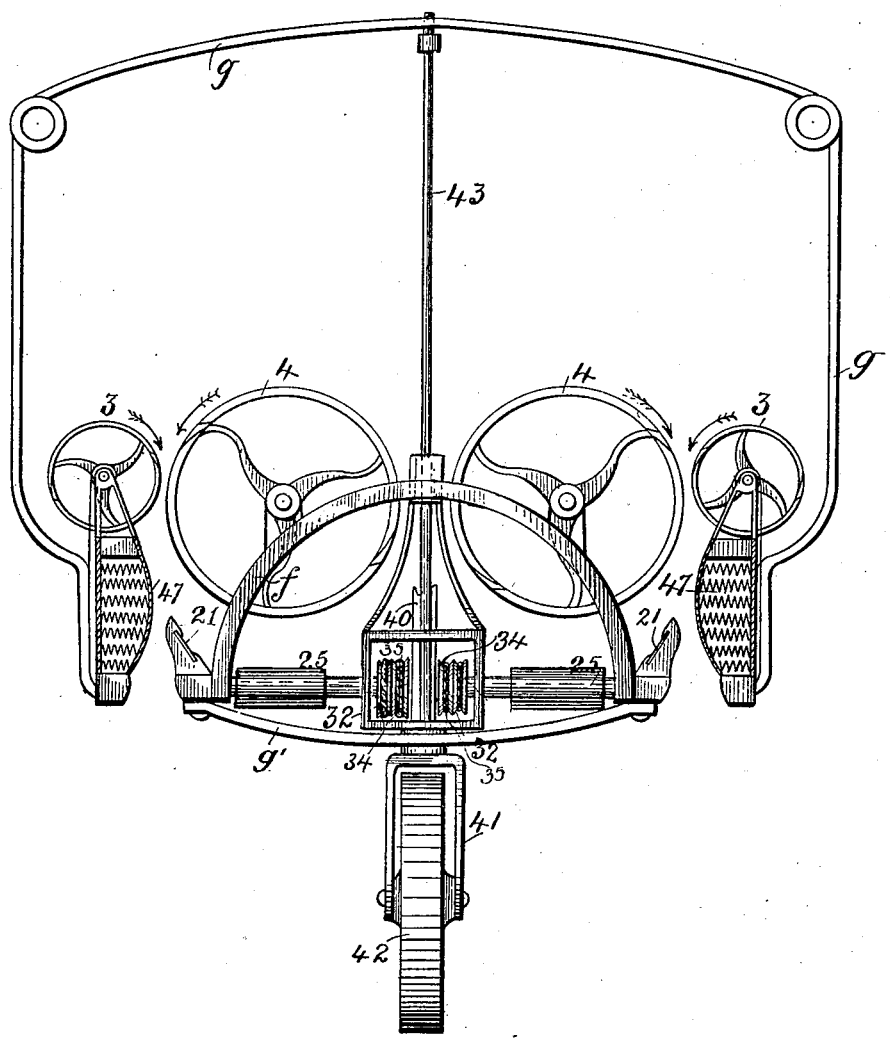

UNITED STATES PATENT OFFICE.

ARTHUR W. RICHARDS, OF INDIANOLA, IOWA.

CORN-HARVESTER.

SPECIFICATION forming part of Letters Patent No. 693,066, dated February 11, 1902.

Application filed June 11, 1901. Serial No. 64,122. (No model.)

*To all whom it may concern:*

Be it known that I, ARTHUR W. RICHARDS, a citizen of the United States, residing at Indianola, in the county of Warren and State of Iowa, have invented a new and Improved Corn-Harvester, of which the following is a specification.

My invention is an improvement in that class of corn-harvesters by which the ears of corn are gathered, leaving the stalks standing as before. The machine is adapted to gather ears from two rows of stalks simultaneously.

The invention is embodied in the mechanism employed for severing the ears from opposite sides of each row of stalks whatever be the difference of height of the several ears from the ground; also, in the means for depositing the severed ears in a suitable receptacle provided on the machine. The different agents utilized for the first purpose—namely, severing the ears from the stalk—are spiral reel cutters extending longitudinally on the front portion of the machine-frame and arranged adjacent to a slot in the frame into and through which the standing corn passes as the machine advances. These reel cutters differ in size, and one is arranged lower than the other and spaced from it a distance required to admit a row of cornstalks, so that the cutters operate simultaneously on opposite sides of the latter. I also employ reciprocating cutters, which I arrange at a point below the rotary reel cutters, but parallel to the same, for the purpose of severing the ears which are not clipped or reached by the upper cutters. The ears severed by the several cutters fall upon the endless traveling aprons or elevators, by which they are conveyed to another similar elevator, and thus finally deposited in the receptacle provided for them.

The construction, arrangement, and operation of parts are as hereinafter described, reference being had to the accompanying drawings, in which—

Figure 1 is a side view of my improved machine. Fig. 2 is a plan view of the same. Fig. 3 is a front view, parts being in section. Figs. 4 and 5 are views representing the gearing for operating the several corn-cutters, and Fig. 6 is a detail view showing the location and arrangement of the rollers with which the standing stalks pass in contact.

In the following description letters will be employed to indicate fixed parts of the machine, especially the frame thereof, and numerals will be used to indicate movable parts or operating mechanism.

In Figs. 1 and 2, A indicates a rectangular box or body supported upon an axle *a*, having two large transporting-wheels. This box is divided into two compartments *c d*, (see Fig. 2,) the rear one, *c*, being intended for the reception of the severed ears of corn and having an upward extension of woven wire. The forward compartment *d* contains mechanism for operating the cutters and endless aprons or elevators.

The box A is provided with forward rigid extensions or frame B, each inclined downward, as shown in Fig. 1, at an angle of about fifteen degrees. These parts B are practically extended arms all arranged parallel and having their front ends curved outward. There are four such parts B, and they are connected transversely by means of curved cross bars or braces *f, g,* and *g'*. (See Fig. 3.) The brace *g* forms the upper arch and connects the outer bars of frame B, while braces *f* and *g'* connect the inner bars of said frame. The cross-brace *g'* is curved downward, and the shaft of the front supporting-wheel 42, passes through it, so that the brace rests upon a shoulder or collar of the shaft, whereby the front portion of the machine is supported on said wheel.

As the machine advances a row of cornstalks enters between the two frames or beams B and passes backward through the same until they strike against the rollers 2, (see Figs. 1 and 6,) by which they are bent downward preliminary to passing backward beneath the body A of the machine. While thus passing backward the ears of corn are severed from the stalks by means of the several cutters about to be described.

As shown in Figs. 2 and 3, there are two pairs of spiral cutting-reels 3 and 4, substantially similar to the cutters employed in a well-known class of lawn-mowers—that is to say, each reel is composed of two or more spiral blades, and each reel is arranged upon and parallel to a portion B of the forward-extending frame and rotates in suitable bearings. The smaller cutters 3 are arranged to work on the outer sides of the rows of stalks and the larger cutters 4 on the inner sides thereof, said cutters 4 being placed at a lower point than the smaller ones. A gear 5 (see Figs. 2 and 4) is fixed on the shaft of each of the smaller cutters or reels 3, and a larger gear 6 is similarly mounted on the shaft of each larger reel 4, the said gears 5 and 6 meshing, as shown, so that they rotate together and inward or toward each other. Rotation is imparted to these gears 5 and 6, and thereby to the reel cutters 3 and 4, by the following means. Each set of the cutters 3 and 4 is, however, operated independently of the other, and motion is derived for each set from the adjacent or nearest transporting-wheel 1 by means of gearing that may be thrown into or out of action at will. An internal annular gear 7 is fixed on the inner side of each transporting-wheel 1, and a movable gear 8 (see Figs. 1 and 2) is arranged in the same plane with said annular gear and adapted to be engaged with it or disengaged therefrom by means of a lever 9 and lever-arm 10. Said lever 9 is pivoted on the outer side of the box A, and the arm 10 pivoted to the middle portion thereof, while its lower end is provided with a slot to receive the pin of the lug 11, fixed on the inner side of the box. The gear 8 is journaled in a projection on this arm 10, by which arrangement when the lever 9 is shifted backward the gear 8 is turned out of engagement with the annulus 7, and, contrariwise, when the lever is shifted forward the gear 8 will be turned into engagement with the annulus 7. As shown in Fig. 2, a gear 13 is mounted on the inner end of the shaft of gear 8, and said shaft and gear 13 therefore partake of the shifting movement of gear 8, as will be readily understood. Consequently when the gear 8 is carried forward into engagement with the annulus 7 the gear 13 is similarly engaged with the gear 14, mounted upon a shaft 15, which also carries a gear 16. The latter is in constant engagement with the gear 17, mounted upon a shaft 18. This shaft also carries a bevel-gear 19, which meshes with another bevel-gear 20, which is fixed, like the gear 6, upon the shaft of each larger reel 4. It is manifest from this arrangement of parts that when the driver, who is in practice comfortably seated upon the box A, operates the lever 9 for throwing the gear 8 into engagement with the annular gear 7 rotation will be imparted to the gear 14, and thereby to the gears 16 and 17, and through the medium of the latter to the shaft 18 and beveled gears 19 and 20, so that the reel cutters 5 and 6 will be rotated toward each other as required for severing ears of corn along their full length. Owing to the downward inclination of the frame B it is further apparent that ears of low stalks as well as high ones will be acted upon.

For the purpose of acting upon the severed ears which may be missed by the rotating cutters 5 and 6, more especially those ears which are located very low upon the stalks, I employ reciprocating cutters. (See Figs. 2, 3, and 5.) These are arranged below the outer edge of each of the large rotary cutters 4, the cutter proper being arranged to reciprocate in slotted fingers similarly to those employed in an ordinary mower or reaper and arranged at an angle of about forty-five degrees transversely.

The cutters 21 are reciprocated from the shaft 18, which carries the gears 17, as before stated. As shown in Fig. 5, a link 22 connects the cutter-bar 21 with a lever 23, which is arranged vertically and pivoted centrally in a bracket or rigid arm $23^a$, attached to the box A, its upper end being forked to adapt it to embrace the eccentric keyed on the shaft 18. It is apparent that as the shaft 18 rotates the lever 23 will be vibrated on its pivot, and thereby rapidly reciprocate the lever 21. The rotary cutters operating at the same time, the result is that the ears of corn are severed from the stalks and caused to fall in the same direction upon endless traveling aprons or elevators 25. (See dotted lines, Fig. 1, and full lines, Figs. 2 and 3.) These aprons or elevators are formed of stout duck or other suitable material and provided with teeth for carrying along the corn-ears and preventing the same sliding backward. The aprons or elevators are arranged on shafts or rollers adapted to rotate, the aprons passing around the same, as in Fig. 1. Other idle rollers will in practice be arranged between the upper and lower portions of the aprons at points intermediate of their ends. These endless aprons or elevators deliver the corn-ears to other endless elevators which are shorter and arranged at an angle at about forty-five degrees and serve to deliver the ears into the rear compartment c of box A.

The shorter elevators or aprons 26 run on pulleys fixed on shafts 27 at upper end and 15 at the lower end. The shafts 15 being rotated as before described will cause aprons 26 to travel whenever the cutters are operated; but in order to insure operation I employ endless rope belts 28, (see Fig. 2,) which run on pulleys 29, fixed on shafts 15 and 27. The longer endless aprons or elevators 25 derive motion from the same alined shafts 15. Rope belts 30 run from pulleys on said shafts 15 around pulleys 32, arranged at the front end of the frame B. (See Fig. 2.) Pulleys 34 are keyed alongside said pulleys 32, and rope belts 35 run therefrom to pulleys on short shafts 37, which are parallel to shafts 15, but arranged in front of the same. The rope belts 30 and 35 are employed of this length in order to obtain the requisite friction and pull required to operate the elevators 25. It is obvious that different gearing may be substituted, and I do not restrict myself in this regard, it being my purpose only to show a practicable arrangement for the purpose.

The horses or other animals employed for draft are hitched on the outside of the frames B to singletrees 37, arranged nearly in front of the transporting-wheels and having a spring attached at 38. This provided attachment is supported upon a rigid bar $h$, from which a rod or bar $i$ extends back to the axle $a$. The machine is guided by means of the lever 39, which is suitably mounted upon the frame $g$ to enable it to swing laterally and extends back into suitable proximity to the driver's seat. The shaft 43, extending upward from the caster-wheel 42, is journaled in frame $g$ and extends through the lever 39, which is further connected with it by a rod 40, that passes through a lateral arm 44, fixed on the upper end of said shaft 43. The rod 40 is curved abruptly at its lower end, where it is provided with a ring or sleeve through which the shaft 43 passes. When the lever 39 is swung to the right or left, the arm 44 will be carried with it and will turn the shaft 43, and thereby the wheel 42 also, so that said wheel will be caused to track in the direction required to guide the machine.

As shown in Fig. 3, I provide spring-cushions 47 opposite the rotary cutters 4 and reciprocating cutters 21 and directly under the rotary cutters 3, their function being to form an elastic cushion or contact-surface for the ears of corn while being acted upon by the rotary cutters. The said cushions are formed by means of spiral springs and a flexible covering of leather or some other suitable material.

The rear compartment of the receptacle A is in rear of the axle $a$, so that whatever load is deposited therein assists in balancing the weight of the extension or frame B.

The arched frame $g$ is preferably constructed of steel in order that it may have maximum strength and lightness.

It is apparent that the cutters and aprons on one side of the machine may be operated while those on the other side lie idle, since the gearing on one side of the machine is entirely separate from that on the other side and may hence be thrown into or out of action independently.

I claim—

1. In a corn-harvester a receptacle mounted upon wheels, and a slotted frame extending forward therefrom, rotary spiral cutters arranged on opposite sides of the slot or guideway for the corn, means for rotating said cutters inward or toward each other and means for conveying the severed ears back to the said receptacle substantially as shown and described.

2. In a corn-harvester the combination with a fixed box or receptacle and a forwardly-extended frame provided with the slot or guideway for the standing corn, of two spiral cutters arranged on opposite sides of such guideway and differing in size, the larger one being located on the inner side at a lower point than the smaller one, and an endless traveling apron arranged beneath the larger cutter, for conveying the severed ears to said receptacle, substantially as shown and described.

3. In a corn-harvester, the combination, with a receptacle mounted upon wheels and having a forwardly-extended frame provided with a slot or guideway for the corn, of a reciprocating cutter arranged adjacent to such guideway on the inner side thereof, and a rotary cutter arranged above such reciprocating cutter, and an endless traveling apron arranged inwardly from the reciprocating cutter and beneath the rotary cutter, substantially as shown and described.

4. In a corn-harvester, the combination, with a receptacle mounted upon wheels and having a forwardly-extended slotted frame, cutters arranged parallel to the slot, and a spring-cushion or buffer arranged on the opposite side of said slot, substantially as shown and described.

5. In a corn-harvester, the combination, with a receptacle mounted upon wheels and having a slotted forwardly-extended frame, of cutters arranged parallel to said frame, endless traveling aprons arranged beneath the cutters, and a second traveling apron coöperating with the first, for delivering ears of corn into the receptacle, gearing for operating the said cutters and aprons, other gearing which is in contact mesh therewith, an internal gear fixed on one of the transporting-wheels and a shiftable gear adapted for engagement with a gear on the said wheel, and also with the gearing for actuating the cutters and aprons, substantially as shown and described.

6. In a corn-harvester, the combination, with a receptacle mounted on wheels and having a forwardly-extended slotted frame, of two rotary cutters arranged parallel to said frame, on opposite sides of the slot, spur-gears fixed on the shafts of said cutters and meshing as shown, a bevel-gear on one of the cutter-shafts, a transverse shaft having spur and bevel gears as specified and an internal gear on the adjacent wheel substantially as shown and described.

7. In a corn-harvester, the combination, with the box or receptacle, transporting-wheels, and a forwardly-extended slotted frame, of the third transporting and caster wheel, a forked, rotatable, vertical shaft in whose fork said wheel is journaled, a pivoted lever extending rearward into proximity to the box, a rigid arm on the shaft, a rod passing through said arm and attached to the shaft, and cross-braces attached to said frame and supporting it upon the caster-wheel, as shown and described, to operate as specified.

8. In a corn-harvester, the combination, with a box or receptacle mounted upon wheels and having a forwardly-extended, slotted frame, of cutters arranged alongside the slot in said frame, and a spring-cushion or buffer also located adjacent to said slot, substantially as and for the purpose specified.

ARTHUR W. RICHARDS.

Witnesses:
H. L. ROSS,
S. B. RICHARDS.